(12) United States Patent
Matiash

(10) Patent No.: US 6,924,461 B2
(45) Date of Patent: Aug. 2, 2005

(54) GAS DIFFUSER FOR HEAD TUBE ASSEMBLY OF WELDING GUN

(75) Inventor: Nicholas A. Matiash, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 65 days.

(21) Appl. No.: 10/334,347

(22) Filed: Dec. 31, 2002

(65) Prior Publication Data

US 2004/0074888 A1 Apr. 22, 2004

Related U.S. Application Data

(63) Continuation-in-part of application No. 10/272,210, filed on Oct. 16, 2002, now Pat. No. 6,720,528.

(51) Int. Cl.[7] .................................................. B23K 9/16
(52) U.S. Cl. .................................................. 219/137.42
(58) Field of Search ....................... 219/137.31, 137.42, 219/137.44, 137.51, 137.52, 137.61

(56) References Cited

U.S. PATENT DOCUMENTS

| | | | | |
|---|---|---|---|---|
| 4,529,863 A | * | 7/1985 | Lebel ..................... | 219/137.42 |
| 4,572,942 A | * | 2/1986 | Church .................. | 219/137.42 |
| 6,225,599 B1 | | 5/2001 | Altekruse .............. | 219/137.31 |
| 6,444,950 B1 | | 9/2002 | Altekruse et al. ...... | 219/137.42 |
| 6,525,297 B2 | * | 2/2003 | Doherty ................. | 219/137.31 |
| 6,720,528 B1 | * | 4/2004 | Matiash et al. ........ | 219/137.31 |
| 6,744,013 B2 | * | 6/2004 | Jones .................... | 219/137.42 |
| 6,847,009 B2 | * | 1/2005 | Stuart et al. ........... | 219/137.61 |
| 6,852,950 B2 | * | 2/2005 | Giese .................... | 219/137.42 |
| 2002/0113046 A1 | | 8/2002 | Altekruse et al. ...... | 219/137.42 |
| 2002/0113047 A1 | | 8/2002 | Doherty ................. | 219/137.42 |
| 2004/0026394 A1 | * | 2/2004 | Giese | |

OTHER PUBLICATIONS

U.S. Appl. No. 10/215,804, filed Aug. 9, 2002, Giese.*

* cited by examiner

*Primary Examiner*—Kevin P. Kerns
(74) *Attorney, Agent, or Firm*—Ostrager Chong Flaherty & Broitman PC

(57) ABSTRACT

A gas diffuser for a welding gun in which atmospheric air in the interior of the liner is substantially prevented from entering the contact tip hole. The gas diffuser includes a cradle having a hole and a section of a concave surface disposed around a periphery of the hole, and an outer peripheral body having a first axial bore on one side of the cradle and a second axial bore on the other side of the cradle. The outer peripheral body includes one or more generally axial slots, each slot having one end that opens into the first axial bore and another end that opens into the second axial bore. Each slot is open to the exterior of the diffuser along its length and is disposed radially outward of the cradle. The first and second axial bores communicate via the hole in the cradle and via the slots.

36 Claims, 3 Drawing Sheets

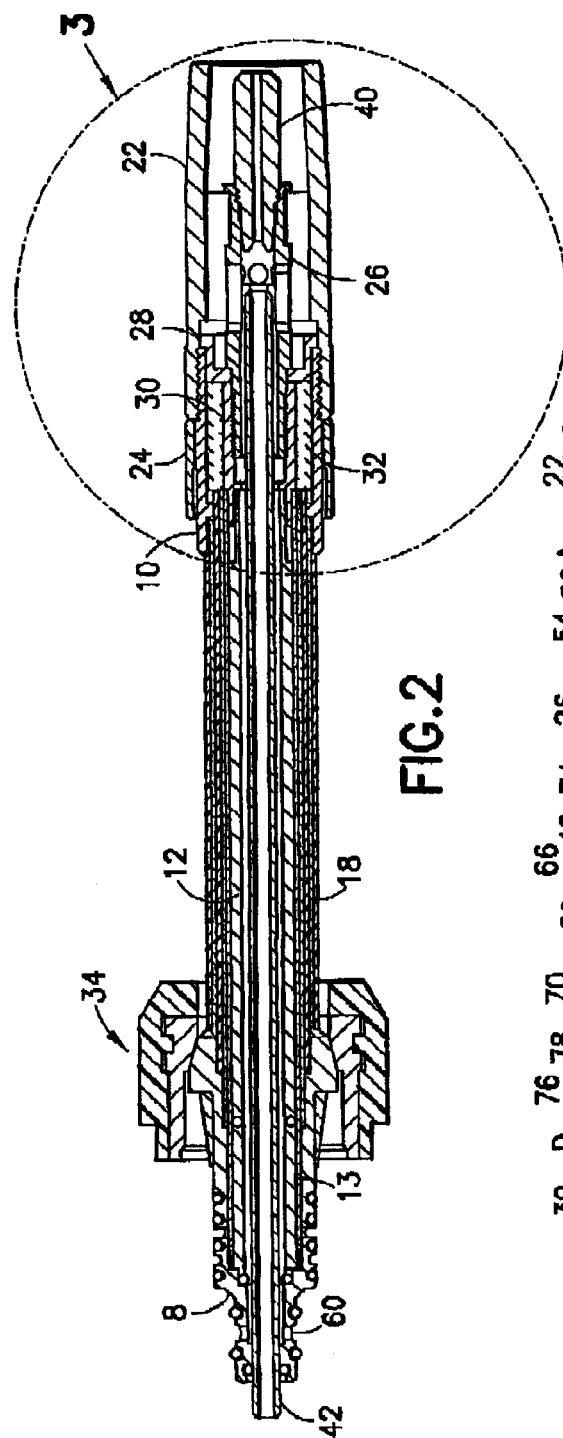
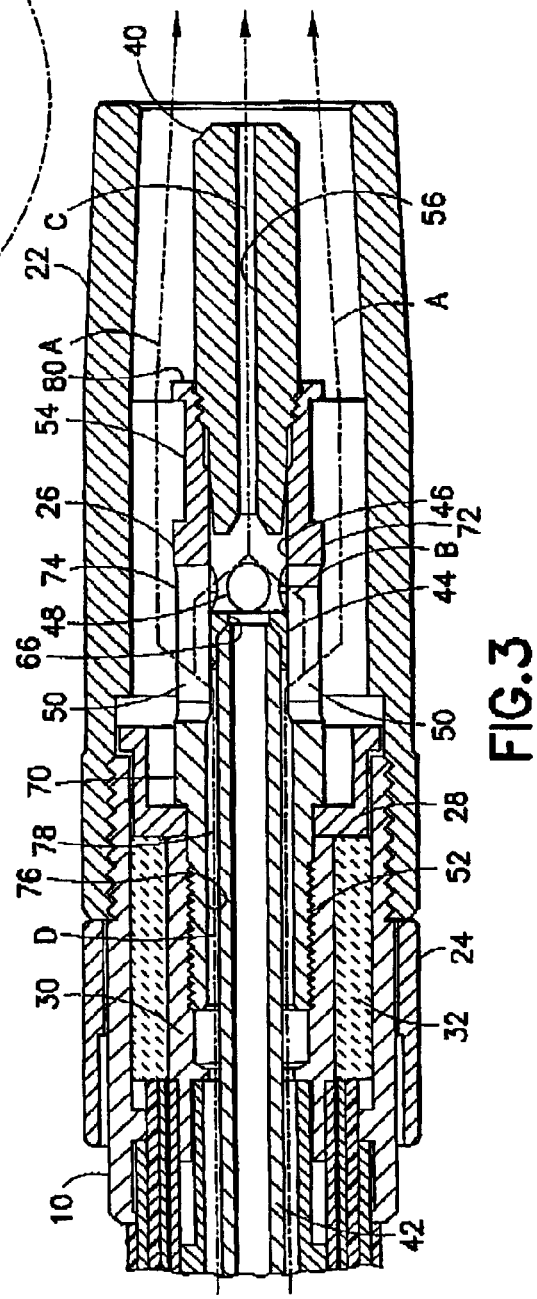

GAS DIFFUSER FOR HEAD TUBE ASSEMBLY OF WELDING GUN

RELATED PATENT APPLICATION

This application is a continuation-in-part application claiming priority from U.S. patent application Ser. No. 10/272,210 filed on Oct. 16, 2002 and entitled "Head Tube Assembly Having Insulated Mechanical Interface with Welding Gun Body", now U.S. Pat. No. 6,720,528.

BACKGROUND OF THE INVENTION

This invention generally relates to gas metal arc welding (GMAW) and flux core arc welding (FCAW). In particular, the invention relates to wire feeding guns.

Wire feeding guns must perform several different functions in order for successful welding to occur. Those functions include directing the weld wire to the workpiece, conducting electric power to the weld wire, and shielding the welding arc from atmospheric air. In addition to the foregoing basic requirements, it is highly desirable that the weld wire be fed to the workpiece at an adjustable rate that suits the particular welding operation at hand. For maximum productivity, it is also necessary that the gun be very comfortable for the operator to maneuver as he directs the weld wire to the workpiece.

To satisfy the foregoing requirements, the wire feeding gun is connected by a long flexible cable to a wire feeder, which is wired to a welding machine. The wire feeder supplies the weld wire, electric power, cooling fluid, and shielding gas through the cable to the gun. In some instances, the cable may be as long as 50 feet.

In a typical wire feeding gun arrangement, there is a head tube on the end of the handle opposite the flexible cable. A diffuser is joined to the free end of the head tube. A contact tip is connected to the diffuser. The weld wire is guided by a liner (i.e., a tube), placed inside the head tube, that extends from the handle to the diffuser. From the diffuser, the weld wire passes through an axial hole in the contact tip, from which it emerges under the impetus of the feed mechanism.

In gas-shielded applications, it is vital that the gas adequately shield the welding arc from the ambient atmosphere. For that purpose, gas is supplied to the wire feeding gun from the wire feeder through the flexible cable. The gas is directed through the head tube to the interior of the diffuser. The gas flows from the diffuser to a nozzle that surrounds the contact tip. The gas then flows out the nozzle and surrounds the contact tip and the weld wire emerging from the contact tip. The gas thus shields the weld wire and the welding arc from the ambient atmosphere.

U.S. Pat. No. 6,225,599 discloses a MIG welding gun wherein the weld wire passes through the interior of a liner having a frusto-conical chamfer surface at its downstream end and then through the bore of a diffuser having a frusto-conical surface of the same geometry as the liner chamfer. The liner chamfer abuts the diffuser frusto-conical surface to locate the liner relative to the diffuser. The apex end of the diffuser frusto-conical locating surface terminates in a short modified cylindrical surface. From the cylindrical surface, the diffuser bore opens at a radial surface to receive the outer diameter of the contact tip. The contact tip has an axial hole through which the weld wire passes.

The diffuser disclosed in U.S. Pat. No. 6,225,599 has a short modified cylindrical surface between the diffuser locating surface and an enlarged inner diameter. An angled surface connects the enlarged inner diameter with the modified cylindrical surface. The diffuser inner diameter cooperates with the liner outer diameter to form a relatively large annular chamber. One or more radial holes extend through the diffuser wall from the inner diameter to the diffuser outer surface. Upstream of the annular chamber, the diffuser has a smaller inner diameter that surrounds the liner and cooperates with it to form a relatively long passage. Inert gas under a pressure greater than atmospheric pressure flows down this passage to the annular chamber, out the radial holes and into the space outside the contact tip and inside the nozzle. From this space, the inert gas flows out the open end of the nozzle to surround the welding arc.

To prevent atmospheric air present in the interior of the liner from flowing through the axial hole in the contact tip to the arc, U.S. Pat. No. 6,225,599 discloses the formation of an inert gas seal that blocks atmospheric air in the liner from entering the contact tip hole. This is achieved by bleeding some of the inert gas in the diffuser annular chamber through an axial passage that communicates with the interior of the liner at the tip of the latter. The pressure of the inert gas in the liner interior blocks atmospheric air in the liner interior upstream of the gas seal from flowing downstream into the contact tip hole. In one disclosed embodiment, the gas seal comprises a sealing space between the downstream end of the liner and the upstream end of the contact tip. The weld wire is unsupported within this sealing space. The gas seal bleeds inert gas from the diffuser annular chamber through a passage to the liner interior by way of the sealing space. The passage of the gas seal is in the form of at least one and preferably more (e.g., three) slots formed in the diffuser between the annular chamber and the sealing space. Other than through these slots, the contact of the liner chamfer with the diffuser locating surface prevents communication between the annular chamber and the sealing space. In addition to flowing out the radial holes, some of the inert gas in the diffuser bleeds through the slots to the sealing space and then, due to the higher than atmospheric pressure, tends to flow upstream into the interior of the liner. That action blocks any atmospheric air in the liner interior from reaching the sealing space. Some of the inert gas will also flow downstream from the sealing space into the contact tip hole, thereby providing an even more effective blockage to any air that might reach the sealing space. The result is that the welds of the workpiece are substantially free from sooty deposits.

The U.S. Pat. No. 6,225,599 teaches the concept of creating a direct route for the shielding gas to get past the downstream end of the liner and into the contact tip hole, thereby improving shielding performance. However, there is a need for an improved design that replicates the foregoing shielding performance benefits, but is less complex and less costly to manufacture.

BRIEF DESCRIPTION OF THE INVENTION

The invention is directed to a gas diffuser for a welding gun in which atmospheric air in the interior of the liner is substantially prevented from entering the contact tip hole. This gas diffuser has a simple design and is relatively inexpensive to manufacture. In addition, it has a relatively small outer diameter and supports soft (e.g., made of plastic material) head tube liners with minimal deformation of the downstream end of the liner.

One aspect of the invention is a gas diffuser for a welding gun, comprising a cradle having a hole and a section of a concave surface disposed around a periphery of the hole, and an outer peripheral body having a first axial bore on one side of the cradle and a second axial bore on the other side of the cradle. The outer peripheral body comprises a generally axial slot having one end that opens into the first axial bore and another end that opens into the second axial bore. The slot is open to the exterior of the diffuser along its length and is disposed radially outward of the cradle. The first and second axial bores communicate via the hole in the cradle and via the slot.

Another aspect of the invention is a head tube assembly for a wire feeding welding gun comprising: a tube for guiding weld wire, the tube having a downstream end with a centering feature; a gas diffuser comprising a cradle having a hole for passage of weld wire and a section of a concave surface disposed around a periphery of the hole for mating with the centering feature of the first tube, and an outer peripheral body having a first axial bore upstream of the cradle and a second axial bore downstream of the cradle, the downstream end of the first tube being disposed inside the first axial bore of the outer peripheral body with an annular channel therebetween; and a contact tip having an axial hole for guiding weld wire that extends the length of the contact tip from an entrance formed in an upstream end of the contact tip to an exit formed in a downstream end of the contact tip, the entrance of the axial hole being separated from the hole in the cradle by a space within the second axial bore of the diffuser. The outer peripheral body of the diffuser comprises a generally axial slot having one end that opens into the first axial bore and another end that opens into the second axial bore. The slot is open to the exterior of the diffuser along its length and disposed radially outward of the cradle. The first and second axial bores communicate via the hole in the cradle and via the axial slot. The diffuser and the contact tip are electrically conductive.

A further aspect of the invention is a head tube assembly for a wire feeding welding gun comprising: a first tube for guiding weld wire, the tube having a downstream end with a centering feature; a second tube surrounding the first tube with an annular gap therebetween, the second tube being made of electrically conductive material; and an electrically conductive structure electrically coupled to the second tube. The electrically conductive structure comprises: a cradle portion with a centering feature that cooperates with the centering feature of the first tube during assembly so that an axis of the electrically conductive structure is coaxial with an axis of the downstream end of the first tube, the cradle portion also having a hole for passage of weld wire exiting the first tube; a weld wire guide portion having an axial hole for guiding weld wire, the entrance of the axial hole being located downstream of and separated by a space from the hole in the cradle portion; and a peripheral body portion comprising a first portion upstream of the cradle portion and a second portion that extends from the first portion of the peripheral body portion to the weld wire guide portion, the second portion in turn comprising a portion disposed radially outward of the cradle portion. The first portion of the peripheral body portion and the first tube define an axial channel that communicates with the annular gap between the first and second tubes, and the second portion of the peripheral body portion comprises a slot that communicates with the axial channel and with the space between the cradle portion and the entrance to the axial hole of the weld wire guide portion.

Yet another aspect of the invention is a head tube assembly for a wire feeding welding gun, comprising: a contact tip made of electrically conductive material and having an axis and an axial hole that extends the length of the contact tip; a nozzle having an axis that is generally parallel to the axis of the contact tip and a portion that surrounds at least a portion of the contact tip with a generally annular space therebetween; a tube having a bore sized to guide weld wire being fed, an entrance of the axial hole in the contact tip being generally aligned with and spaced apart from an exit at one end of the tube; a cradle having an axis of symmetry substantially coaxial with the axis of the bore of the tube, the cradle comprising a hole that communicates with the exit of the bore of the tube and a centering feature disposed on a periphery of the hole for centering the one end of the tube relative to the axis of symmetry, the cradle being separated from the upstream end of the contact tip by a space; and supporting structure that supports the cradle, the nozzle and the contact tip in substantially fixed positions relative to each other. The tube, supporting structure, cradle, nozzle and contact tip define the following flow paths for pressurized shielding gas: (a) shielding gas flows downstream along an axial channel formed outside the tube and inside a portion of the supporting structure; (b) shielding gas from the axial channel is diffused, the diffusing shielding gas having both radially outward and axially downstream flow components, the gas diffusion occurring upstream of the cradle; (c) a first portion of the diffused shielding gas flows through the annular space between the nozzle and the contact tip; and (d) a second portion of the diffused shielding gas flows with a radially inward flow component into the space between the cradle and the upstream end of the contact tip and then flows through the axial hole in the contact tip.

A further aspect of the invention is a method for passing pressurized shielding gas through a head tube assembly of a welding gun, wherein the head tube assembly comprises a tube with a bore for passing weld wire, a cradle with a centering feature for centering an abutting end of the tube, and a contact tip with an axial hole for passing the weld wire. The method comprises the following steps: (a) guiding the pressurized shielding gas to flow downstream along an axial channel adjacent the tube; (b) diffusing the pressurized shielding gas at the end of the axial channel, the diffusing shielding gas having both radially outward and axially downstream flow components, the gas diffusion occurring upstream of the cradle; (c) guiding diffused pressurized shielding gas to flow downstream and past the cradle; and (d) guiding a portion of the diffused pressurized shielding gas radially inward into a space in front of the cradle and behind the contact tip and then into the axial hole in the contact tip.

Other aspects of the invention are disclosed and claimed below.

BRIEF DESCRIPTION OF THE DRAWINGS

FIG. 2 is a drawing showing a straightened sectional view of the head tube assembly depicted in FIG. 1 with the liner and contact tip added.

FIG. 3 is a drawing showing a magnified sectional view of the portions of the head tube assembly lying within the dash-dot circle in FIG. 2.

Reference will now be made to the drawings in which similar elements in different drawings bear the same reference numerals.

DETAILED DESCRIPTION OF THE INVENTION

Figure 1:
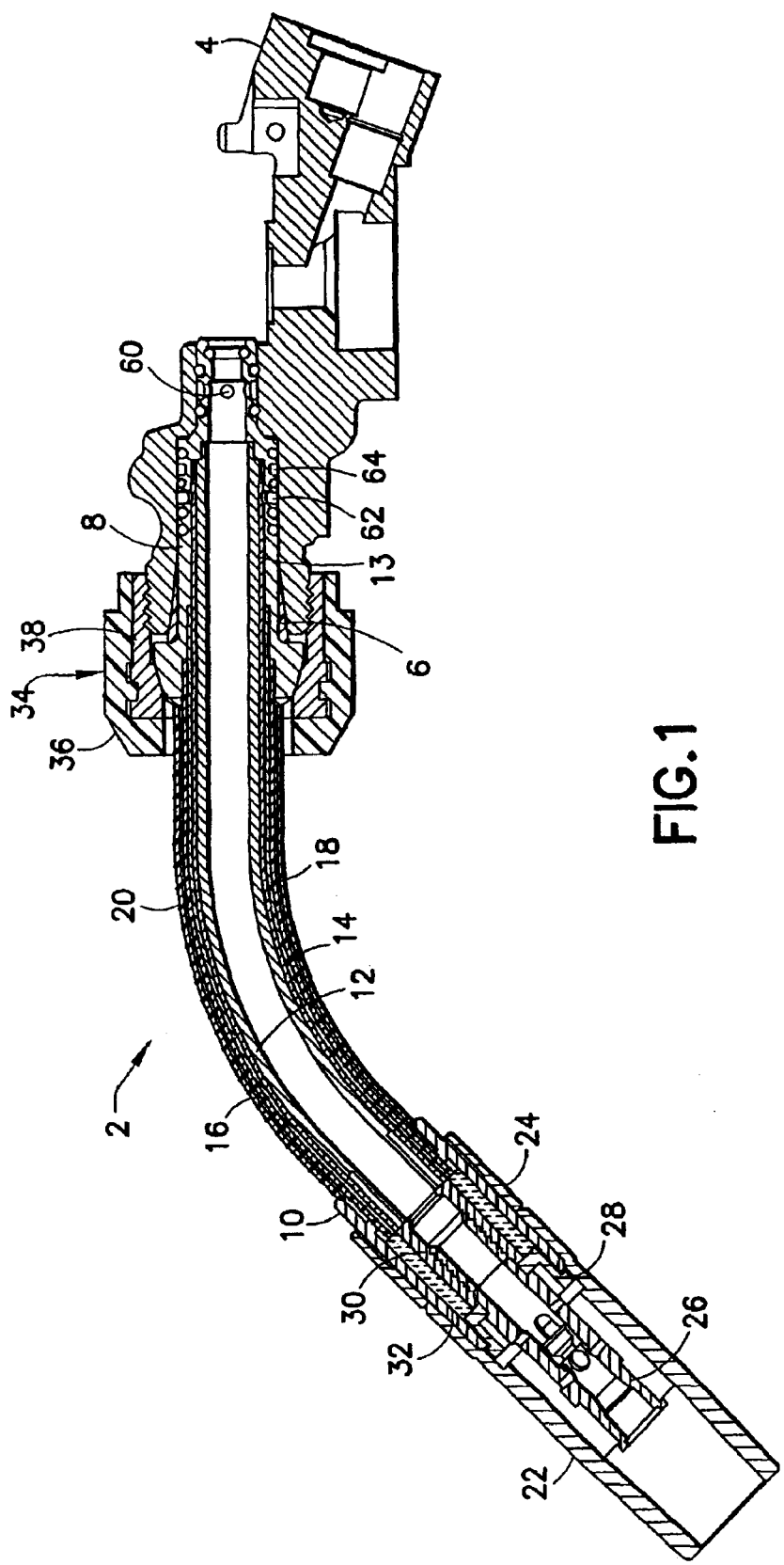
FIG. 1 is a drawing showing a sectional view of a head tube assembly fastened to a welding gun body in accordance with one embodiment of the present invention. The liner and contact tip are not shown.

A head tube assembly in accordance with one embodiment of the invention is shown in FIGS. 1–3. Referring to FIG. 1, a welding gun comprises a head tube assembly 2 mechanically and electrically coupled to an electrically conductive welding gun body 4. The welding gun body 4 has a threaded outer peripheral surface and a cavity defined in part by a frusto-conical inner peripheral surface 6. The head tube assembly 2 comprises respective fittings 8 and 10 brazed to the opposing ends of a tubular structure consisting of an inner copper tube 12, an outer copper sleeve 13, a steel tube 14 surrounding copper sleeve 13, a TEFLON casing 16 encasing steel tube 14, a steel tube 18 surrounding TEFLON casing 16, and an outer TEFLON casing 20 encasing steel tube 18. The end of the copper tube 12 is inserted in and brazed to brass fitting 8. Middle and end sections of the fitting 8, having different diameters, fit inside respective sections of the aforementioned cavity of the gun body 4. Thus, the head tube assembly 2 is supported at one end by the gun body 4.

At the other end of the head tube assembly (best seen in FIG. 3), a head tube outer jacket fitting 10 is brazed to the distal end of steel tube 18 and in turn supports the nozzle 22. The nozzle 22 is locked in position by a nozzle adapter locking nut 24. A diffuser 26, disposed inside the nozzle, is threaded into copper piece 30, which is brazed to the end of the copper tube 12. Copper piece 30 is surrounded by a ceramic insulator ring 32. Item 28 in FIG. 1 is a diffuser insulator. Referring to FIG. 2, the copper tube 12 conducts electric current from the fitting 8 to the diffuser 26, which in turn transmits the electric current to a contact tip 40. Accordingly, the diffuser 26 is electrically hot. The ceramic insulator 32 is supported by the copper piece 30 to separate the electrically hot copper tube 12 and diffuser 26 from the electrically cold steel tube 18, fitting 10, and nozzle 22. The contact tip 40 transmits the electrical current from the diffuser 26 to the welding wire (not shown). The welding wire is fed to a bore in the diffuser 26 via a liner 42 that lies inside the copper tube 12. The liner 42 may be electrically conductive or electrically insulative.

Referring again to FIG. 1, the fitting 8 is coupled to the gun body 4 by means of a molded rotation nut 34. The rotation nut 34 comprises a threaded brass nut 38 encased in molded nylon 36. In the assembly view of FIG. 1, the brass nut 38 is in contact with the gun body 4 and the fitting 8. Electric current is transmitted from the gun body 4 to the fitting 8 via the brass nut 38. The brass nut 38 has a threaded inner peripheral surface that threadably engages a threaded outer peripheral surface of the gun body 4. The rotation nut 34 retains the fitting 8 in a coupled state with the gun body 4 when the rotation nut 34 is fully threadably engaged with the gun body 4.

Still referring to FIG. 1, the electrical insulator 6 is disposed between and in contact with a circular cylindrical outer peripheral surface of the fitting 8 and a frusto-conical inner peripheral surface of the gun body 4. The insulator 6 may be made of DELRIN. The electrical insulator 6 acts as a shield to prevent current from being transmitted directly from the frusto-conical inner peripheral surface of the gun body 4 to the fitting 8. The insulator 6 is ring-shaped and comprises a frusto-conical outer peripheral surface that will be located inside and in contact with the frusto-conical inner peripheral surface of the gun body 4, causing self-centering of the insulator (and consequently, centering of the fitting) relative to the gun body cavity.

Referring to FIG. 1, the brass fitting 8 that couples the head tube assembly to the gun body is a machined part comprising a generally circular cylindrical middle section having a first outer diameter, a collar on one side of the middle section, and a generally circular cylindrical end section having a second outer diameter on the other side of the middle section, the second diameter being smaller than the first diameter. The gun body 4 has respective bore sections sized to receive the circular cylindrical middle and end sections of the fitting. The collar of the fitting 8 comprises a frusto-conical outer peripheral surface that engages a frusto-conical inner peripheral surface of the brass nut 38 during tightening of the molded nut 34 onto the threaded end of the gun body 4.

The liner 42 passes through the bore of the fitting 8. The bore of the fitting 8 is provided with a plurality of radial holes 60 spaced at equal angular intervals about the circumference, which holes allow communication between the fitting bore and an annular groove formed (by O-ring seals) on the outer periphery of the fitting. The annular groove in turn communicates with a channel in the gun body that supplies shielding gas. The gas flows from the holes to the gas diffuser 26 along the outside of the liner 42 and inside the copper tube 12.

The wire feeding gun disclosed herein may be a water-cooled system or an air-cooled system. For the sake of illustration, FIG. 1 shows a water-cooled system. The cooling water is supplied to the head tube assembly via a channel in the welding gun body. The middle section of the fitting 8 is provided with a two pairs of slots (62 and 64 in FIG. 1) that are displaced longitudinally relatively to each other. These slots allow communication between the fitting bore and a respective pair of annular grooves formed (by O-ring seals) on the outer periphery of the fitting. One of annular grooves communicates with a channel in the gun body that supplies cooling water, while the other annular groove communicates with a channel in the gun body that removes cooling water. The water enters via one pair of slots, travels toward the diffuser in channels between longitudinal lobes formed on the one side of the outer periphery of copper tube 12, encapsulated by copper sleeve 13, reverses direction in an annular groove at the end of the copper tube, travels back toward the fitting in channels between longitudinal lobes formed on the other side of the outer periphery of copper tube 12, and then exits via the other pair of slots. Furthermore, the wire feeding gun may be an air-cooled system instead of a water-cooled system.

By means of the above-described mechanical interface design, welding current is passed through the brass nut 38 that holds the head tube assembly in place to the fitting 8. The welding current then flows through the copper tube 12, copper piece 30, diffuser 26 and contact tip 40. The contact tip 40 transmits the welding electrical power from the diffuser 26 to the weld wire (not shown).

The nozzle assembly in accordance with the disclosed embodiment of the invention is shown in greater detail in FIG. 3. The flow of shielding gas is indicated by dash-dot arrows respectively designated A, B and C, as will be described in greater detail hereinafter. The nozzle 22 surrounds the insulator 28, diffuser 26 and contact tip 40, forming a generally annular space surrounding the diffuser and contact tip through which the main flow of shielding gas passes. This flow is indicated by the arrows labeled "A".

The liner 42 extends from near the feed rollers (not shown) to a circular cylindrical bore in the upstream end of the diffuser. This diffuser bore has an inner diameter greater than the outer diameter of the liner by an amount sufficient to form an annular channel between the diffuser bore and liner for the flow of shielding gas (labeled "D" in FIG. 3) in a downstream direction. The weld wire (not shown) passes through the interior of the liner 42. The downstream end of the liner 42 has a frusto-conical chamfer surface that seats in a matching frusto-conical surface of the same geometry formed in the cradle 44 of the diffuser 26. The liner chamfer abuts the diffuser frusto-conical surface to locate the liner relative to the diffuser. The apex end of the diffuser frusto-conical locating surface terminates in a circular hole 66 that communicates with and is aligned with the bore of the liner 42. The contact tip 40 has a threaded portion engaged with a threaded bore section 80 at the downstream end of the diffuser 26. When the upstream end of the contact tip 40 is screwed into the downstream end of the diffuser 26, the axial hole 56 is generally coaxial with the bore of the liner 42. The weld wire passes through circular hole 66, across an internal volume of the diffuser 26 defined in part by a circular cylindrical bore section 46 and through the axial hole 56 in the contact tip 40. The inlet of the axial hole 56 in the contact tip 40 is chamfered to assist in guiding the weld wire into the hole 66.

The cradle 44 (see FIG. 3) of the disclosed embodiment is a frusto-conical surface with a circular hole at its apex. However, the cradle may have a concave shape that is not frusto-conical. For example, the cradle could be a spherical section, a surface formed by revolving a section of a parabola, hyperbola, ellipse or other concave curve. In general, the cradle can have a concave surface that matches and contacts a complementary convex chamfer on the end of the liner. Preferably, these mating surfaces have axial symmetry. However, the inventive diffuser structure that defines the path of the shielding gas around the end of the liner can be used with liner-locating (i.e., centering) structures that lack axial symmetry. For example, the tip of the liner and the cradle could be frusto-pyramidal in shape.

Figure 4:
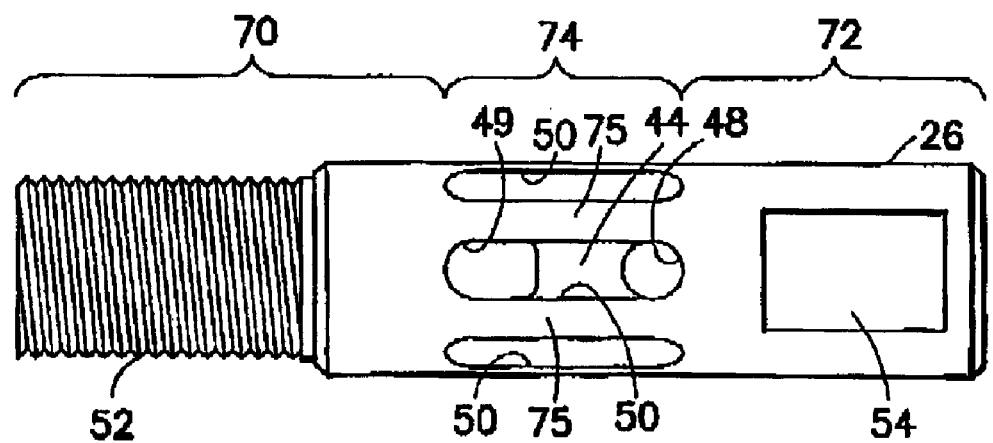
FIG. 4 is a drawing showing a side view of a gas diffuser in accordance with the embodiment depicted in FIG. 3.

The cradle may be integrally formed with or connected to the intermediate portions of six linear axial sections 75 that define six slots 50 therebetween in an intermediate section 74 of the gas diffuser 26 (see FIG. 4). The slots 50 are formed with generally parallel side walls, so that the linear axial sections therebetween have profiles that are generally in the shape of sections of an annular ring, bearing in mind that the slot side walls are parallel and do not lie along radial lines. Thus a cross section of the diffuser taken through the cradle 44 would have the general shape of a gear, the six teeth of this gear shape having centerlines generally disposed at equal angles of about 60°.

As seen in FIG. 4, the intermediate section 74 is disposed between an upstream section 70 and a downstream section 72 of the gas diffuser 26. As best seen in FIG. 3, the downstream section 72 of the diffuser 26 has a circular cylindrical bore section 46 and a threaded bore section 80 at its distal end that receives the outer diameter of the upstream end of the contact tip 40. The upstream section 70 of the diffuser 26 has a partially threaded outer peripheral surface 52 that engages the threaded bore of the copper piece 30 and has an unthreaded bore 76 that surrounds a section of liner 42 with an annular space 78 therebetween. Since the liner 42 is held in a centered position by the engagement of the frusto-conical surfaces on the end of the liner and in the cradle 44 of the diffuser 26, the shielding gas flows downstream in the annulus. 78 between the liner and diffuser and then flows through the openings 49 (see FIG. 4) by which the slots 50 communicate with the aforementioned annular flow path (indicated by letter "D" in FIG. 3). After the shielding gas flows with axial (downstream) and radial (outward) components through the openings 49, streams of shielding gas flow along the axial slots 50 while the major portion of the shielding gas flows axially downstream through the annular volume bounded on the outer periphery by the nozzle 22 and bounded on the inner periphery by the diffuser 26 and the contact tip 40. The latter flow is indicated by letter "A" in FIG. 3.

Some of the shielding gas streaming axially downstream along the axial slots 50 is diverted at the ends of the slots and reenters the diffuser 26 via the openings or ports 48 (shown in FIGS. 3 and 4). That radially inwardly diverted flow is indicated by the portion of dash-dot line labeled with the letter "B" in FIG. 3. The diffuser internal volume directly downstream of the cradle (hereinafter "sealing space") is filled with shielding gas that enters via the ports 48, thereby forming a gas seal that prevents atmospheric air present in the interior of the liner 42 from flowing into the axial hole 56 in the contact tip. The weld wire is unsupported within the sealing space between the downstream end of the liner and the upstream end of the contact tip. Other than the six axial slots 50 formed in the diffuser 26, the contact of the liner chamfer with the diffuser locating surface prevents communication between the annular passageway (surrounding the liner) and the sealing space. Due to the higher than atmospheric pressure of the shielding gas, it tends to flow upstream into the interior of the liner and around the weld wire. That action blocks any atmospheric air in the liner interior from reaching the sealing space. Some of the shielding gas will also flow downstream from the sealing space into the contact tip hole 56. The flow of shielding gas through the axial hole 56 in the contact tip 40 is indicated by the dash-dot arrow labeled with the letter "C".

FIG. 4 shows a side view of the gas diffuser in accordance with the disclosed embodiment. The diffuser has six mutually parallel axial slots 50 circumferentially distributed at equiangular intervals of 60° when viewed in a plane orthogonal to the axis of the diffuser. Each slot 50 communicates with the bore of the diffuser via respective openings or ports 48 and 49. The six ports 49 are located upstream of the cradle 44, while the six ports 48 are located downstream of the cradle 44. Since the central hole (item 66 in FIG. 3) at the apex of the cradle 44 is closed off to the flow of shielding gas when the end of the liner is seated against the cradle, the shielding gas flow is diverted through the six slots and around the cradle so that the sealing space between the cradle 44 and the entrance to the contact tip hole can be substantially filled with shielding gas, which then enters the contact tip hole, as previously described. The result is better shielding gas coverage and therefore better welds.

The diffuser of the disclosed embodiment is designed to also provide improved support for soft head tube liners. When plastic head tube liners are used, they are relatively soft compared to metal liners. This is especially prevalent at the nozzle (downstream) end of the liner because the heat generated during welding softens the plastic. The weld wire sliding through the plastic liner tends to push the liner toward the nozzle. The design disclosed herein cradles the end of a plastic liner and does not deform it. Any deformation could pinch the weld wire, interfering with wire feeding.

In the disclosed embodiment, the contact tip is screwed into the diffuser so that the contact tip can be easily replaced without replacing the diffuser. To facilitate installation of the diffuser 26 into the copper piece 30, a pair of diametrally opposed flat surfaces 54 are provided on the exterior of the downstream end of the diffuser 26 to allow the diffuser to be tightened using a wrench.

Alternatively, the contact tip and diffuser could be coupled by a nut or other fastener. Furthermore, although it is convenient to maintain the contact tip and diffuser as separate components due to the greater wear experienced by the contact tip, these components could be connected together, e.g., by brazing, or integrally formed as one piece of electrically conductive material, e.g., by casting or machining.

Although the disclosed embodiment has six open slots that provide a path for shielding gas to flow around the liner/diffuser interface and into the chamber in front of the cradle and behind the contact tip, a person skilled in the art will appreciate that more or fewer than six slots could be used. In the extreme case, a single open slot in the diffuser could be used.

The invention is further directed to a method for passing pressurized shielding gas through a head tube assembly of a welding gun. The flow of shielding gas is passive in the sense that it is dependent on the pressure differential between a pressurized source of shielding gas and atmospheric pressure at the nozzle exit of the head tube assembly. As described above, in general, the head tube assembly comprises a tube (e.g., liner 42) with a bore for passing weld wire, a cradle 44 with a centering feature for centering an abutting end of the tube, and a contact tip 40 with an axial hole 56 for passing the weld wire. The method comprises the following steps: (a) guiding the pressurized shielding gas to flow downstream (flow D in FIG. 3) along an axial channel adjacent the tube; (b) diffusing the pressurized shielding gas at the end of the axial channel, the diffusing shielding gas having both radially outward and axially downstream flow components, the gas diffusion occurring upstream of the cradle 44; (c) guiding diffused pressurized shielding gas to flow downstream and past the cradle 44; and (d) guiding a portion of the diffused pressurized shielding gas radially inward (flow B in FIG. 3) into a space in front of the cradle and behind the contact tip and then into the axial hole 56 in the contact tip 40.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A gas diffuser for a welding gun, comprising a peripheral wall that defines an axial bore, and a cradle disposed in said axial bore and supported by said peripheral wall, said cradle having a hole and a section of a concave surface disposed around a periphery of said hole, a first section of said axial bore on one side of said cradle communicating with a second section of said axial bore on the other side of said cradle via said hole in said cradle, said peripheral wall comprising a first generally axial slot partially closed off at its bottom from said axial bore and having one end that opens into said first section of said axial bore and another end that opens into said second section of said axial bore, said first slot being open to the exterior of said diffuser along its length and being disposed radially outward of said cradle, said first and second sections of said axial bore also communicating via said first slot.

2. The diffuser as recited in claim 1, wherein said peripheral wall further comprises a second generally axial slot having one end that opens into said first section of said axial bore and another end that opens into said second section of said axial bore, said second slot being open to the exterior of said diffuser along its length and being disposed radially outward of said cradle, said first and second sections of said axial bore also communicating via said second slot.

3. The diffuser as recited in claim 1, wherein said peripheral wall comprises a plurality of generally axial slots distributed at equiangular intervals about a circumference of said peripheral wall, said first slot being one of said plurality of slots, each of said slots having one end that opens into said first section of said axial bore and another end that opens into said second section of said axial bore, and being open to the exterior of said diffuser along its length and being disposed radially outward of said cradle, said first and second sections of said axial bore communicating via each of said plurality of slots.

4. The diffuser as recited in claim 1, wherein said first slot is generally oval-shaped.

5. The diffuser as recited in claim 1, wherein each end of said peripheral wall is threaded.

6. The diffuser as recited in claim 1, wherein said concave surface section of said cradle is frusto-conical in shape with an axis of symmetry that is substantially coaxial with an axis of said axial bore.

7. The diffuser as recited in claim 3, wherein said peripheral wall comprises a plurality of linear axial sections that define said slots, said cradle being supported by said linear axial sections, and respective bottoms of said slots being partially closed off from said axial bore by said cradle to define respective first openings upstream of said cradle and respective second openings downstream of said cradle, each of said slots communicating with said first section of said axial bore via a respective one of said first openings and communicating with said second section of said axial bore via a respective one of said second openings.

8. The diffuser as recited in claim 1, wherein said peripheral wall and said cradle are integrally formed.

9. The diffuser as recited in claim 1, wherein said peripheral wall and said cradle are made of brass.

10. The diffuser as recited in claim 3, wherein said plurality of slots are circumferentially distributed at angular intervals of approximately 60°.

11. A head tube assembly for a wire feeding welding gun comprising:

a tube for guiding weld wire, said tube having a downstream end with a centering feature;

a gas diffuser comprising a peripheral wall that defines an axial bore, and a cradle disposed in said axial bore and supported by said peripheral wall, said cradle having a hole for passage of weld wire and a section of a concave surface disposed around a periphery of said hole for mating with said centering feature of said tube, a first section of said axial bore upstream of said cradle communicating with a second section of said axial bore downstream of said cradle via said hole in said cradle, said downstream end of said tube being disposed inside said first section of said axial bore of said peripheral wall with an annular channel therebetween, said peripheral wall of said gas diffuser comprising a first generally axial slot partially closed off at its bottom from said axial bore and having one end that opens into said annular channel and another end that opens into said second section of said axial bore, said first slot being open to the exterior of said diffuser along its length and being disposed radially outward of said cradle, said first and second sections of said axial bore also communicating via said first slot; and a contact tip having an axial hole for guiding weld wire that extends the length of said contact tip from an entrance formed in an upstream end of said contact tip to an exit formed in a downstream end of said contact tip, said upstream end of said contact tip being inserted in said second section of said axial bore of said gas diffuser and supported by said downstream end of said gas diffuser, said entrance of said axial hole of said contact tip being separated from said hole in said cradle of said gas diffuser by a space within said second section of said axial bore of said gas diffuser, wherein said gas diffuser and said contact tip are electrically conductive.

12. The head tube assembly as recited in claim 11, wherein said peripheral wall comprises a plurality of generally axial slots distributed at equiangular intervals about a circumference of said peripheral wall, said first slot being one of said plurality of slots, each of said slots being partially closed off at its bottom from said axial bore and having one end that opens into said first section of said axial bore and another end that opens into said section of said second axial bore, and being open to the exterior of said diffuser along its length and being disposed radially outward of said cradle, said first and second sections of said axial bore communicating via each of said plurality of slots.

13. The head tube assembly as recited in claim 11, wherein said concave surface section of said cradle is frusto-conical in shape with an axis of symmetry that is substantially coaxial with an axis of said axial bore.

14. The head tube assembly as recited in claim 11, wherein said peripheral wall and said cradle are integrally formed.

15. The head tube assembly as recited in claim 12, wherein said plurality of slots are circumferentially distributed at angular intervals of approximately 60°.

16. The head tube assembly as recited in claim 11, further comprising a nozzle that surrounds said contact tip and a major portion of said diffuser length and bounds a substantially annular space, wherein said first slot communicates with said substantially annular space so that pressurized gas flowing down said annular channel between said tube and said peripheral wall flows into and then exits said first slot, a first portion of the exiting gas flowing into said space between said cradle and said contact tip inside said second section of said axial bore, and a second portion of the exiting gas flowing into said substantially annular space between said nozzle and diffuser.

17. A head tube assembly for a wire feeding welding gun comprising:

a first tube for guiding weld wire, said first tube having a downstream end with a centering feature;

a second tube surrounding said first tube with an annular gap therebetween, said second tube being made of electrically conductive material; and an electrically conductive structure electrically coupled to said second tube and comprising:

a cradle portion with a centering feature that cooperates with said centering feature of said first tube during assembly so that an axis of said electrically conductive structure is coaxial with an axis of said downstream end of said first tube, said cradle portion also having a hole for passage of weld wire exiting said first tube;

a weld wire guide portion having an axial hole for guiding weld wire, the entrance of said axial hole being located downstream of and separated by a space from said hole in said cradle portion; and a peripheral wall having an axial bore and comprising a first portion disposed upstream of said cradle portion, a second portion that supports said cradle portion in a position within said axial bore, and a third portion that is coupled to said weld wire guide portion, said space being inside said axial bore, and said second portion of said peripheral wall being intermediate relative to and connected to said first and third portions of said peripheral wall, wherein said first portion of said peripheral wall and said first tube define an axial channel that communicates with said annular gap between said first and second tubes, and said second portion of said peripheral wall comprises a first slot that is partially closed off at its bottom from said axial bore and communicates with said axial channel via a first opening upstream of said partially closed off portion of said first slot and with said space between said cradle portion and said entrance to said axial hole of said weld wire guide portion via a second opening downstream of said partially closed off portion of said first slot.

18. The head tube assembly as recited in claim 17, wherein said second portion of said peripheral wall further comprises a second slot that is partially closed off at its bottom from said axial bore and communicates with said axial channel via a first opening upstream of said partially closed off portion of said second slot and with said space between said cradle portion and said entrance to said axial hole of said weld wire guide portion via a second opening downstream of said partially closed off portion of said second slot.

19. The head tube assembly as recited in claim 17, wherein said second portion of said peripheral wall comprises a plurality of slots that communicate with said axial channel and with said space between said cradle portion and said entrance to said axial hole of said weld wire guide portion, said first slot being one of said plurality of slots, and said plurality of slots being circumferentially distributed at equiangular intervals.

20. The head tube assembly as recited in claim 19, wherein said second section of said peripheral wall comprises a plurality of linear axial sections that define said slots, said cradle portion being supported by said linear axial sections, and respective bottoms of said slots being partially closed off from said axial bore by said cradle portion to define respective first openings upstream of said cradle portion and respective second openings downstream of said cradle portion, each slot communicating with said axial channel via a respective one of said first openings and communicating with said space between said cradle portion and said entrance to said axial hole of said weld wire guide portion via a respective one of said second openings.

21. The head tube assembly as recited in claim 17, wherein said cradle portion and said peripheral wall are made of a first material and said weld wire guide portion is made of a second material different than said first material.

22. The head tube assembly as recited in claim 21, wherein said first material is brass and said second material is, copper alloy.

23. The head tube assembly as recited in claim 17, wherein said centering feature of said cradle portion comprises a peripheral surface surrounding said hole that is a section of a concave surface, and said centering feature of said first tube sits snugly against said peripheral surface of said cradle portion.

24. The head tube assembly as recited in claim 23, wherein said peripheral surface of said cradle portion is frusto-conical.

25. The head tube assembly as recited in claim 17, further comprising a nozzle that surrounds said electrically conductive structure along a major portion of the length of said electrically conductive structure with a substantially annular space between said nozzle and said weld wire guide portion and said second portion of said peripheral wall, wherein said first slot communicates with said substantially annular space so that pressurized gas flowing down said axial channel between said first tube and said first portion of said peripheral wall flows into and then exits said first slot, a first portion of the exiting gas flowing into said space between said cradle portion and said weld wire guide portion and a second portion of the exiting gas flowing into said substantially annular space.

26. The head tube assembly as recited in claim 17, further comprising an electrically conductive coupling that couples said first portion of said peripheral wall to said second tube.

27. A head tube assembly for a wire feeding welding gun, comprising:
- a contact tip made of electrically conductive material and having an axis and an axial hole that extends the length of said contact tip;
- a nozzle having an axis that is generally parallel to the axis of said contact tip and a first portion that surrounds at least a portion of said contact tip with a generally annular space therebetween;
- a tube having a bore sized to guide weld wire being fed, an entrance of said axial hole in said contact tip being generally aligned with and spaced apart from an exit at one end of said tube;
- a cradle having an axis of symmetry substantially coaxial with said axis of said bore of said tube, said cradle comprising a hole that communicates with said exit of said bore of said tube and a centering feature disposed on a periphery of said hole for centering said one end of said tube relative to said axis of symmetry, said cradle being separated from an upstream end of said contact tip by a space; and
- a supporting structure that supports said cradle, said nozzle and said contact tip in substantially fixed positions relative to each other, wherein said tube, said supporting structure, said cradle, said nozzle and said contact tip define the following flow paths for pressurized shielding gas:
(a) shielding gas flows downstream along an axial channel formed outside said tube and inside a portion of said supporting structure;
(b) shielding gas from said axial channel is diffused, said diffusing shielding gas having both radially outward and axially downstream flow components, said gas diffusion occurring upstream of said cradle;
(c) a first portion of said diffused shielding gas flows through said annular space between said nozzle and said contact tip; and
(d) a second portion of said diffused shielding gas flows with a radially inward flow component into said space between said cradle and said upstream end of said contact tip and then flows through said axial hole in said contact tip.

28. The head tube assembly as recited in claim 27, wherein said supporting structure comprises a generally axial slot with one end located axially upstream relative to said cradle and the other end located axially downstream relative to said cradle.

29. The head tube assembly as recited in claim 27, wherein said supporting structure comprises a slotted portion, said slotted portion in turn comprising a plurality of generally axial slots circumferentially distributed at equiangular intervals, each of said generally axial slots having one end located axially upstream relative to said cradle and the other end located axially downstream relative to said cradle.

30. The head tube assembly as recited in claim 29, wherein a second portion of said nozzle surrounds said slotted portion of said supporting structure with a generally annular space therebetween.

31. The head tube assembly as recited in claim 27, wherein portions of said supporting structure are electrically conductive and provide electrical current to said contact tip.

32. The head tube assembly as recited in claim 27, wherein said supporting structure comprises an assembly of components, one of said components being integrally formed with or connected to said cradle.

33. The head tube assembly as recited in claim 29, wherein said plurality of slots are circumferentially distributed at angular intervals of approximately 60°.

34. A method for passing pressurized shielding gas through a head tube assembly of a welding gun, wherein the head tube assembly comprises a tube with a bore for passing weld wire, a cradle with a centering feature for centering an abutting end of said tube and a hole for passing said weld wire, and a contact tip with an axial hole for passing said weld wire, comprising the steps of:
(a) guiding the pressurized shielding gas to flow downstream along an axial channel adjacent said tube;
(b) diffusing the pressurized shielding gas at the end of said axial channel, said diffusing shielding gas having both radially outward and axially downstream flow components, said gas diffusion occurring upstream of said cradle;
(c) guiding diffused pressurized shielding gas to flow downstream and past said cradle; and
(d) guiding a portion of said diffused pressurized shielding gas radially inward into a space in front of said cradle and behind said contact tip and then into said axial hole in said contact tip.

35. The method as recited in claim 34, wherein said axial channel is annular and pressurized shielding gas is diffused through a plurality of openings circumferentially distributed at equiangular intervals.

36. The method as recited in claim 34, further comprising the step of passing a weld wire through said tube bore, said cradle hole, said space and said axial hole in said contact tip, wherein shielding gas flows through the space in said axial hole of said contact tip not occupied by said weld wire.

* * * * *